US012631212B2

(12) United States Patent
Fujimori et al.

(10) Patent No.: US 12,631,212 B2
(45) Date of Patent: May 19, 2026

(54) SHELL TYPE ROLLER BEARING

(71) Applicant: NTN CORPORATION, Osaka (JP)

(72) Inventors: Makoto Fujimori, Shizuoka (JP);
Sadatsune Kazama, Shizuoka (JP)

(73) Assignee: NTN CORPORATION, Osaka (JP)

( * ) Notice: Subject to any disclaimer, the term of this
patent is extended or adjusted under 35
U.S.C. 154(b) by 66 days.

(21) Appl. No.: 18/701,652

(22) PCT Filed: Sep. 30, 2022

(86) PCT No.: PCT/JP2022/036652
§ 371 (c)(1),
(2) Date: Apr. 16, 2024

(87) PCT Pub. No.: WO2023/074252
PCT Pub. Date: May 4, 2023

(65) Prior Publication Data
US 2024/0418219 A1     Dec. 19, 2024

(30) Foreign Application Priority Data

Oct. 28, 2021     (JP) ................................. 2021-176240

(51) Int. Cl.
F16C 19/46        (2006.01)
F16C 33/58        (2006.01)
F16C 33/78        (2006.01)
(52) U.S. Cl.
CPC .......... F16C 19/466 (2013.01); F16C 33/588
(2013.01); F16C 33/7809 (2013.01);
(Continued)

(58) Field of Classification Search
CPC .. F16C 19/466; F16C 33/588; F16C 33/7809;
F16C 33/783; F16C 43/04; F16C 2240/54
See application file for complete search history.

(56) References Cited

U.S. PATENT DOCUMENTS

2006/0153485 A1*   7/2006   Maeda .................. F16C 19/466
                                                      384/569
2007/0047862 A1*   3/2007   Akamatsu ............. F16C 33/543
                                                      384/564
(Continued)

FOREIGN PATENT DOCUMENTS

JP        H05288220 A      11/1993
JP        H06001849 U       1/1994
(Continued)

OTHER PUBLICATIONS

Machine Translation of JP-2002139067-A (Year: 2002).*
Machine Translation of JP-2012117582-A (Year: 2012).*

*Primary Examiner* — Alan B Waits
(74) *Attorney, Agent, or Firm* — Millen, White, Zelano &
Branigan, P.C.; Christopher W. Brody

(57)        ABSTRACT
A shell type roller bearing includes a shell outer ring that
includes a cylindrical portion (12) and a flange (13) extend-
ing radially inward from one axial end of the cylindrical
portion and that is made of an austenitic stainless steel
material. One axial end portion of an inner peripheral
surface (16) of the cylindrical portion (12) is a tilted surface
(16b), the inner diameter of the tilted surface (16b) is larger
than the inner diameter of an axial middle region of the inner
peripheral surface (16), and the hardness of the flange (13)
is in the range of 300 to 450 HV.

7 Claims, 7 Drawing Sheets

(52) U.S. Cl.
   CPC ........ _F16C 33/783_ (2013.01); _F16C 2240/54_
               (2013.01); _F16C 2361/91_ (2013.01)

(56)                   References Cited

U.S. PATENT DOCUMENTS

2007/0253655 A1 * 11/2007 Egami .................. C08F 214/26
                                                   384/484
2008/0232733 A1 *  9/2008 Hashimoto .......... F16C 19/466
                                                   29/898.067

FOREIGN PATENT DOCUMENTS

| JP | H0962098 | A |   | 3/1997 | |
|----|----------|---|---|--------|---|
| JP | 11-303863 | | | 11/1999 | |
| JP | 3212880 | | | 7/2001 | |
| JP | 2002139067 | A | * | 5/2002 | ............. F16C 33/64 |
| JP | 2003202016 | A | | 7/2003 | |
| JP | 2004-293620 | | | 10/2004 | |
| JP | 2004293620 | A | | 10/2004 | |
| JP | 2005-042879 | | | 2/2005 | |
| JP | 2005042879 | A | | 2/2005 | |
| JP | 2005226717 | A | | 8/2005 | |
| JP | 2005308083 | A | | 11/2005 | |
| JP | 2007-064309 | | | 3/2007 | |
| JP | 2007-085446 | | | 4/2007 | |
| JP | 2007085446 | A | | 4/2007 | |
| JP | 2012117582 | A | * | 6/2012 | ............ F16C 19/466 |
| JP | 2013-029145 | | | 2/2013 | |
| JP | 2014149053 | A | | 8/2014 | |
| JP | 2020165438 | A | | 10/2020 | |

* cited by examiner

SHELL TYPE ROLLER BEARING

TECHNICAL FIELD

The present invention relates to roller bearings that take radial loads.

BACKGROUND ART

A bearing described in Japanese Patent No. 3212880 (Patent Literature 1) is conventionally known as a shell type roller bearing. According to the bearing described in Patent Literature 1, constituent elements of the bearing are first assembled into the bearing, and the bearing is then subjected to carbonitriding and subsequently to quenching and tempering. A shell outer ring thus obtained is made of case hardened steel. Specifically, rollers and a cage are mounted in the shell outer ring from one axial end of the shell outer ring, and the one axial end is then bent radially inward to form a flange and relief of the shell outer ring.

CITATION LIST

Patent Literatures

Patent Literature 1: Japanese Patent No. 3212880

SUMMARY OF INVENTION

Technical Problem

Throttle valves for adjusting the amount of air to be supplied to an engine of a motor vehicle etc. are known in the art. Throttle valve bearings are required to have an anti-air leakage function. One possible way for that is to mount a ring-shaped seal member in the one axial end of the shell outer ring of the above conventional shell type bearing.

The seal member has, for example, a lip, and the lip protrudes radially inward and contacts the outer peripheral surface of a throttle valve stem, and thus closes annular clearance of the shell type bearing. In this case, one axial region of the seal member covers the relief of the seal member, and the remaining other axial region is fitted on the inner peripheral surface of the shell outer ring. Therefore, the larger the width of the relief, the smaller the axial fitting dimension and the smaller the radial interference of the seal member, resulting in a decrease in sealing performance of the seal member.

One possible solution to this is to reduce the width of the relief to increase the axial fitting dimension. However, as the width of the relief decreases, the inner peripheral surface of the shell outer ring more tends to bulge when forming the flange by bending. As a result, the bearing clearance is partially reduced, which may result in reduced service life.

In recent years, exhaust gas recirculation (EGR) has been used to improve engine's fuel efficiency, and the above throttle valve bearing may also be exposed to exhaust gases, which have created the need for corrosion resistant bearings. The above conventional shell type roller bearing has room for improvement in corrosion resistance because it uses case hardened steel.

In view of the above circumstances, it is one object of the present invention to provide a shell type roller bearing with improved sealing performance. It is another object of the present invention to provide a shell type roller bearing with improved corrosion resistance.

Solution to Problem

For the above objects, a shell type roller bearing according to the present invention includes: a shell outer ring that includes a cylindrical portion and flanges extending radially inward from one axial end and the other axial end of the cylindrical portion and that is made of an austenitic stainless steel material; a seal member mounted in one axial end portion of the shell outer ring; rollers that make rolling contact with an inner peripheral surface of the cylindrical portion; and a cage disposed radially inside the shell outer ring and holding the rollers. An inner diameter of one axial end portion of the inner peripheral surface is equal to or larger than an inner diameter of an axial middle region of the inner peripheral surface, and at least one of the flanges has a hardness in a range of 300 to 450 HV According to the present invention, corrosion resistance is ensured by the austenitic stainless steel material. Since the hardness of the flange is set in the range of 300 to 450 HV, the inner peripheral surface of the shell outer ring is less likely to bulge when forming the flange by bending, or bulging that occurs in the inner peripheral surface of the shell outer ring can be reduced to a level that does not affect the bearing function. This also reduces the possibility that the bearing clearance may be partially reduced and the service life may be reduced. If the hardness of the flange is less than 300 HV, the press-in force (withstand load) when mounting the bearing into the housing with negative clearance may decrease. If the hardness of the flange is higher than 450 HV, the bulging that occurs in the inner peripheral surface of the shell outer ring may increase. In a preferred aspect of the present invention, of the flanges at both axial ends, the flange having a smaller thickness has a hardness of 300 to 450 HV. This facilitates formation of the flange in the stainless steel outer ring made of stainless steel by bending.

The required accuracy and shape cannot be obtained with the shell type roller bearing alone. Therefore, it is necessary to press-fit the shell type roller bearing into a housing with correct dimensional accuracy. As used herein, the "housing" refers to a housing having an inner diameter smaller than the nominal outer diameter D (integer without a decimal point) of the outer ring by 0.020 mm, and a wall thickness of 20 mm or more. As one aspect of the present invention. According to one aspect of the present invention, a relief extending in a circumferential direction between the inner peripheral surface and the flange is provided in an inner periphery of the shell outer ring, an axial inner portion of the seal member is press-fitted and fixed in the inner peripheral surface, and an axial outer portion of the seal member contacts the flange and covers the relief from inside in a radial direction. After the shell outer ring is press-fitted in a housing, a proportion of a width of the relief to an overall axial dimension of the seal member is 49% or less, the housing being a housing whose inner diameter dimension is smaller than an outer diameter of the shell outer ring before press-fitting by a predetermined value in a range of 0.015 to 0.025 mm, whose wall thickness is 20 mm or more, and whose roundness and/or cylindricity has a maximum value with a correct accuracy of IT4 or higher grade (IT3 or IT2 or IT1). According to this aspect, the relief eliminates the possibility that the inner peripheral surface may bulge radially inward during bending, and also ensure the sealing performance of the seal member. Moreover, the relief allows the bearing of the present invention to be press-fitted into a hole in the housing and ensures a correct accuracy and dimensions. In a preferred aspect, of the two flanges, the flange in which the relief is provided has a hardness in the range of 300 to 450 HV. According to this aspect, the bulging of the inner peripheral surface of the shell outer ring is less likely to occur when forming the relief and forming the flange by bending.

In a preferred aspect of the present invention, a thickness of the cylindrical portion in the inner peripheral surface is 0.4 to 0.6 [mm]. In a preferred aspect of the present invention, regarding the flange having a smaller thickness out of the flanges at both axial ends, a portion of the flange that has the smallest hardness has a hardness of 300 to 400 HV. This facilitates formation of the flange by bending and stabilizes the quality of the shell outer ring. In a preferred aspect of the present invention, a length of the rollers is 2.1 to 5.4 times a diameter of the rollers. In a preferred aspect of the present invention, the seal member is made of fluororubber, and the seal member has a hardness of HS 65 to 85. According to this aspect, corrosion resistance and sealing performance of the seal member can be confirmed.

In a further preferred aspect of the present invention, a portion of the inner peripheral surface of the cylindrical portion that makes surface contact with the axial inner portion of the seal member has a roughness Ra of 0.6 [μm] or less. The same size portion is therefore smooth, so that air leakage is prevented.

In a further preferred aspect of the present invention, the shell type roller bearing rotatably supports a stem of a throttle valve or a stem of an EGR valve. According to this aspect, the service life of the shell type roller bearing can be extended in an atmosphere of high temperature gas and/or corrosive gas.

Advantageous Effects of Invention

As described above, according to the present invention, the sealing performance and corrosion resistance of the shell type roller bearing are improved compared to conventional shell type roller bearings. The shell type roller bearing of the present invention is suitably used in high temperature places, places where airtightness is required, and places where corrosion resistance is required.

DESCRIPTION OF EMBODIMENTS

Hereinafter, an embodiment of the present invention will be described in detail with reference to the drawings. FIG.

Figure 1:
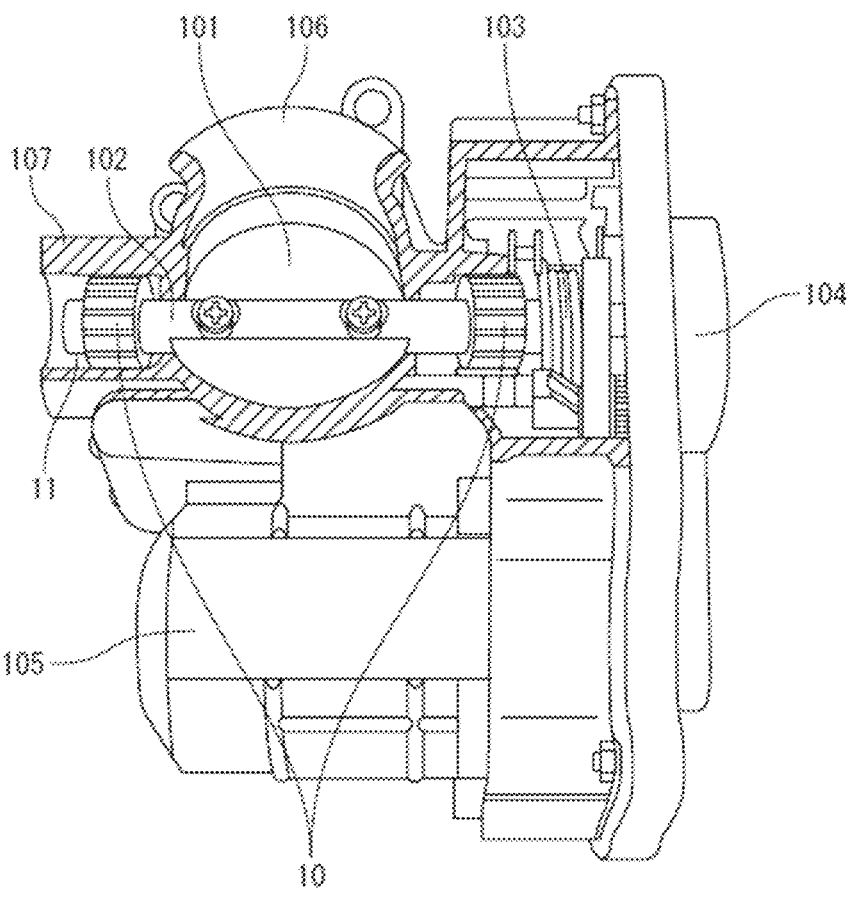
FIG. 1 is a diagram showing a throttle valve structure in which the present invention is used.
Figure 2:
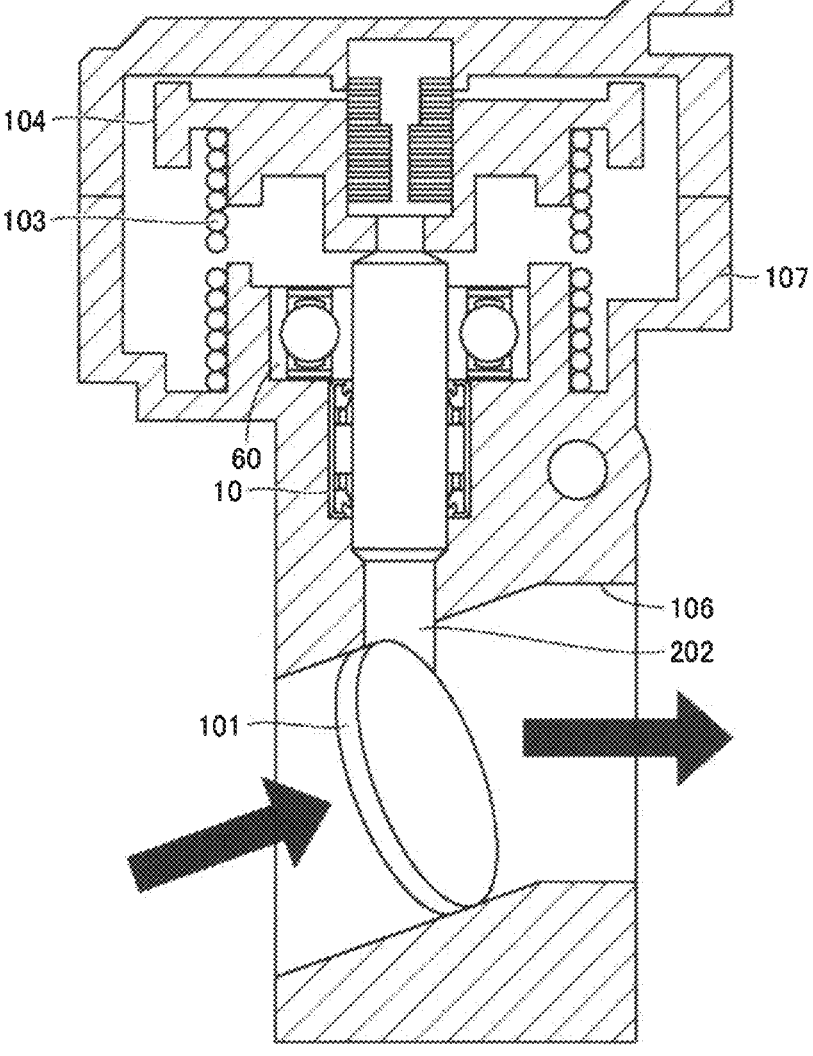
FIG. 2 is a diagram showing an EGR valve structure in which the present invention is used.
Figure 3:
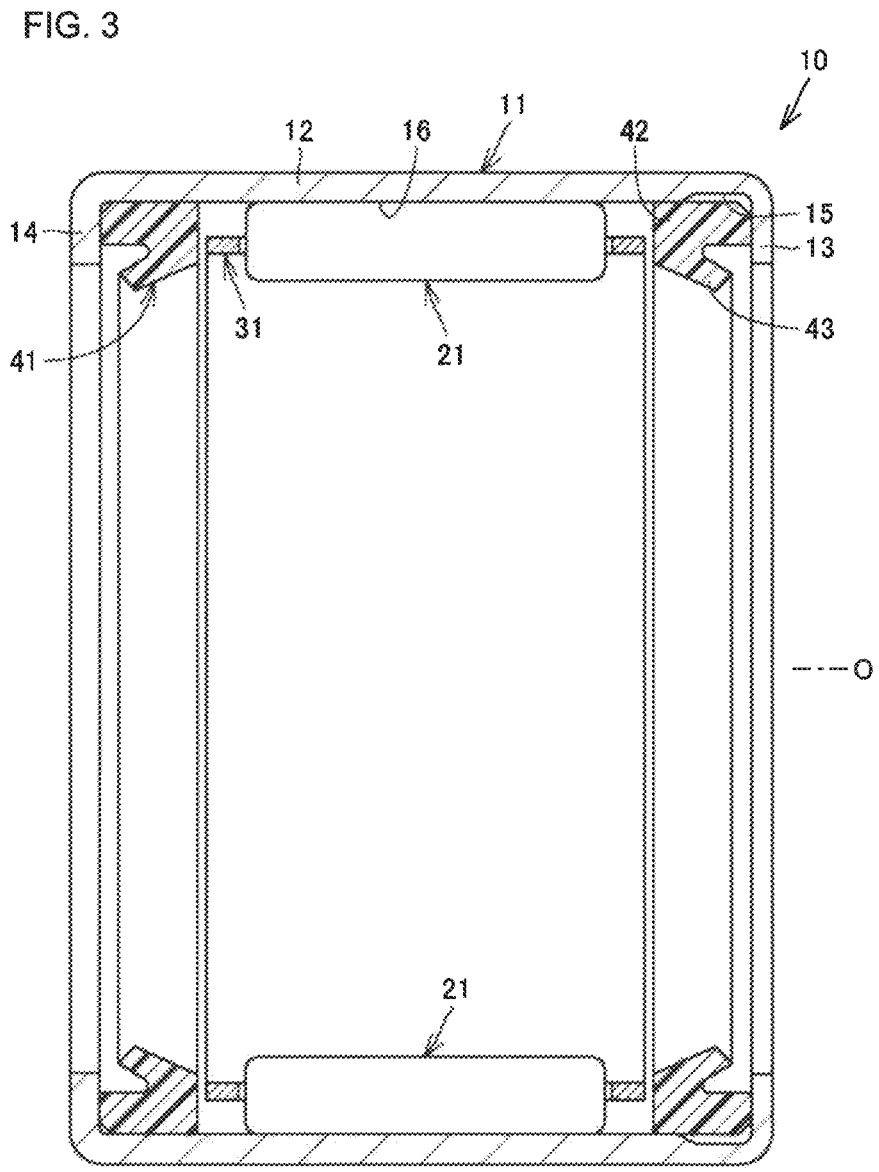
FIG. 3 is a longitudinal section showing a shell type roller bearing according to an embodiment of the present invention.

1 is a diagram showing a throttle valve structure in which a bearing of the present invention is used. FIG. 2 is a diagram showing an EGR valve structure in which the bearing of the present invention is used. FIG. 3 is a longitudinal section showing a shell type roller bearing according to an embodiment of the present invention. The structure shown in FIG. 1 includes shell type roller bearings 10, a valve disc 101, a throttle valve stem 102, an elastic member 103, a drive transmission mechanism 104, a driving source 105, an air pipe 106, and a case 107. The air pipe 106 has its one end (not shown) connected to an engine, not shown, and supplies air for combustion to the engine that is an internal combustion engine.

The valve disc 101 is a circular metal plate, and is installed in an intermediate portion of the air pipe 106. The throttle valve stem 102 extends so as to cross the air pipe 106, and the valve disc 101 is fixed to a middle portion of the throttle valve stem 102. Both end portions of the throttle valve stem 102 extend through a metal wall of the air pipe 106. Both end portions of the throttle valve stem 102 are rotatably supported by the shell type roller bearings 10. Shell outer rings 11 of the shell type roller bearings 10 are mounted and fixed by being press-fitted in holes of the metal case 107 (housing) formed integrally with the air pipe 106 and supporting the air pipe 106.

The elastic member 103 is mounted on one end of the throttle valve stem 102. The elastic member 103 is, for example, a coil spring. The elastic member 103 has its one end fixed to the case 107, and biases the throttle valve stem 102 in a closing direction. The valve disc 101 thus closes the air pipe 106 (opening degree: 0) without being driven at all.

The shell type roller bearings 10 have sealing performance and seal the air pipe 106. This prevents air flowing in the air pipe 106 from flowing out of the pipe through the shell type roller bearings 10. This will be described in detail later.

The case 107 is further provided with the drive transmission mechanism 104 and the driving source 105. The one end of the throttle valve stem 102 is connected to the drive transmission mechanism 104. The drive transmission mechanism 104 is connected to the driving source 105. The driving source 105 is, for example, an electric motor, and rotates the throttle valve stem 102 in an opening direction via the drive transmission mechanism 104. The valve disc 101 thus opens the air pipe 106 to a desired opening degree against the biasing force of the elastic member 103.

The structure shown in FIG. 2 includes a shell type roller bearing 10, a ball bearing 60, a valve disc 101, a valve stem 202, an elastic member 103, a drive transmission mechanism 104, an air pipe 106, and a case 107. The same members as those in the structure described above are denoted by the same reference numerals as those in the structure described above, and description thereof will be omitted. The distal end of the valve stem 202 reaches inside the air pipe 106 and is coupled to the valve disc 101. The proximal end of the valve stem 202 is coaxially coupled to a gear of the drive transmission mechanism 104. A middle portion of the valve stem 202 is located outside the air pipe 106 and is supported by the case 107 via the shell type roller bearing 10 and the ball bearing 60.

As shown in FIG. 2, the shell type roller bearing 10 is mounted on the distal end side (valve disc 101 side) of the valve stem 202, and the ball bearing 60 is mounted on the proximal end side of the valve stem 202.

The shell type roller bearing 10 has sealing performance and seals the air pipe 106. This prevents gas flowing in the air pipe 106, especially high temperature, high pressure exhaust gases, from flowing out of the pipe through the shell type roller bearing 10.

As shown in FIG. 3, the shell type roller bearing 10 includes a shell outer ring 11, rollers 21, a cage 31, and seal members 41. In the following description, the circumferential direction refers to the circumferential direction of the shell type roller bearing 10, the axial direction or the axis O direction refers to the direction in which an axis O representing the center of the shell type roller bearing 10 extends, inner in the axis O direction refers to the direction from an end in the axis O direction of the shell type roller bearing 10 toward the middle in the axis O direction of the shell type roller bearing 10, and outer in the axis O direction refers to the direction from the middle in the axis O direction of the shell type roller bearing 10 toward an end in the axis O direction of the shell type roller bearing 10.

The shell outer ring 11 is a stainless steel outer ring having a cylindrical portion 12, flanges 13, 14, and a relief 15 and made of stainless steel, and specifically, is made of austenitic stainless steel such as SUS304. Such a shell outer ring 11 has corrosion resistance.

An inner peripheral surface 16 of the cylindrical portion 12 constitutes an outer raceway surface for the rollers 21. The flanges 13, 14 are in the form of an inward flange formed at the ends in the axis O direction of the cylindrical portion 12, and restrict movement of the rollers 21, the cage 31, and the seal members 41 in the axis O direction. The thickness in the axis O direction of the flange 13 of the present embodiment is smaller than the thickness in the axis O direction of the flange 14. The reason for this is for convenience of bending. In the manufacturing process of the shell type roller bearing 10, a raw material portion that will later become the flange 13 is made to protrude further outward in the axis O direction from the cylindrical portion 12, and a stepped portion is formed on the inner periphery of the raw material portion to make the raw material portion thin. After the rollers 21 and the cage 31 are placed inside the cylindrical portion 12, the raw material portion is bent radially inward. During this bending, the relief 15 is formed in one end portion in the axis O direction of the cylindrical portion 12. The relief 15 is a circumferential groove extending between the inner peripheral surface 16 and the flange 13 along the entire circumference. The shell outer ring 11 of the present embodiment is produced by deep drawing starting from a flat circular plate. The flange 14 is formed of the original flat circular plate. No relief adjacent to the flange 14 is formed.

The plurality of rollers 21 is arranged at intervals in the circumferential direction, and rolls on the inner peripheral surface of the shell outer ring 11. The cage 31 is disposed between the flanges 13, 14 on both sides in the axial direction, and maintains the circumferential spacing between the rollers 21. The rollers 21 of the present embodiment are needle rollers. Specifically, the roller length is 2.1 to 5.4 times the roller diameter.

The sealing members 41 are rings made of a polymer material, and are disposed between one flange 13 and the cage 31 and between the other flange 14 and the cage 31. The material of the seal members 41 of the present embodiment is fluororubber and has corrosion resistance. The hardness of the fluororubber is preferably set in the range of HS 65 to 85. As is understood from the longitudinal sectional shape shown in FIG. 3, each seal member 41 has an annular base portion 42 whose axial dimension is larger than its radial interference, and an annular lip portion 43 branching from the base portion 42 in the radial direction. The lip portion 43 of the present embodiment protrudes radially inward from the base portion 42 and extends outward in the axis O direction.

Figure 4:
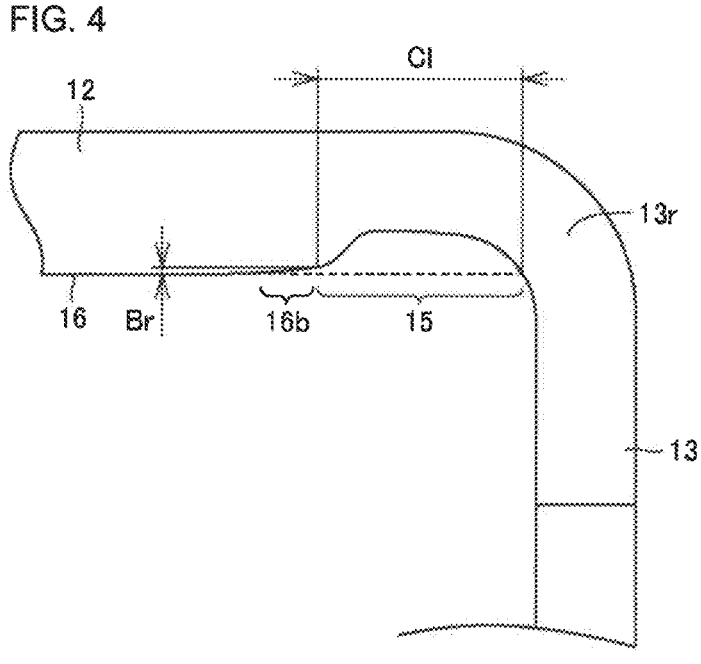
FIG. 4 is an enlarged section showing one axial end portion of a shell outer ring of the embodiment.

FIG. 4 is an enlarged section of one end portion in the axis O direction of the shell outer ring 11, showing a circled area in FIG. 3. The inner peripheral surface 16 has a uniform inner diameter from the middle in the axis O direction toward the outer side in the axis O direction. However, a tilted surface 16b with a gentle slope is provided at the end of the inner peripheral surface 16, and the diameter of the tilted surface 16b gradually increases toward the outer side in the axis O direction like a tapered hole.

The tilted surface 16b smoothly connects to the relief 15. A position having a diameter greater than the inner diameter of the inner peripheral surface 16 by a radial dimension Br is defined as a boundary between the tilted surface 16b and the relief 15. The radial dimension Br is, for example, a predetermined value of 20 [μm] or less.

The relief 15 smoothly connects to the inner surface of the flange 13. A position at the root of the flange 13 that has the same diameter as the inner diameter of the inner peripheral surface 16 is defined as a boundary between the relief 15 and the flange 13. The distance between these two boundaries in the axial direction is defined as a width Cl of the relief 15. The width Cl is set to a dimension large enough that the inner peripheral surface 16 will not bulge radially inward when forming the flange 13 by bending.

Since the shell outer ring 11 is made of stainless steel and has higher hardness than ordinary steel materials, there is a potential risk of the bulging. Even if such bulging occurs, the tilted surface 16b absorbs the bulge. In a modification that is not shown, the tilted surface 16b may not be provided and the relief 15 may be connected to the inner peripheral surface 16 having a constant inner diameter.

Figures 5, 6:
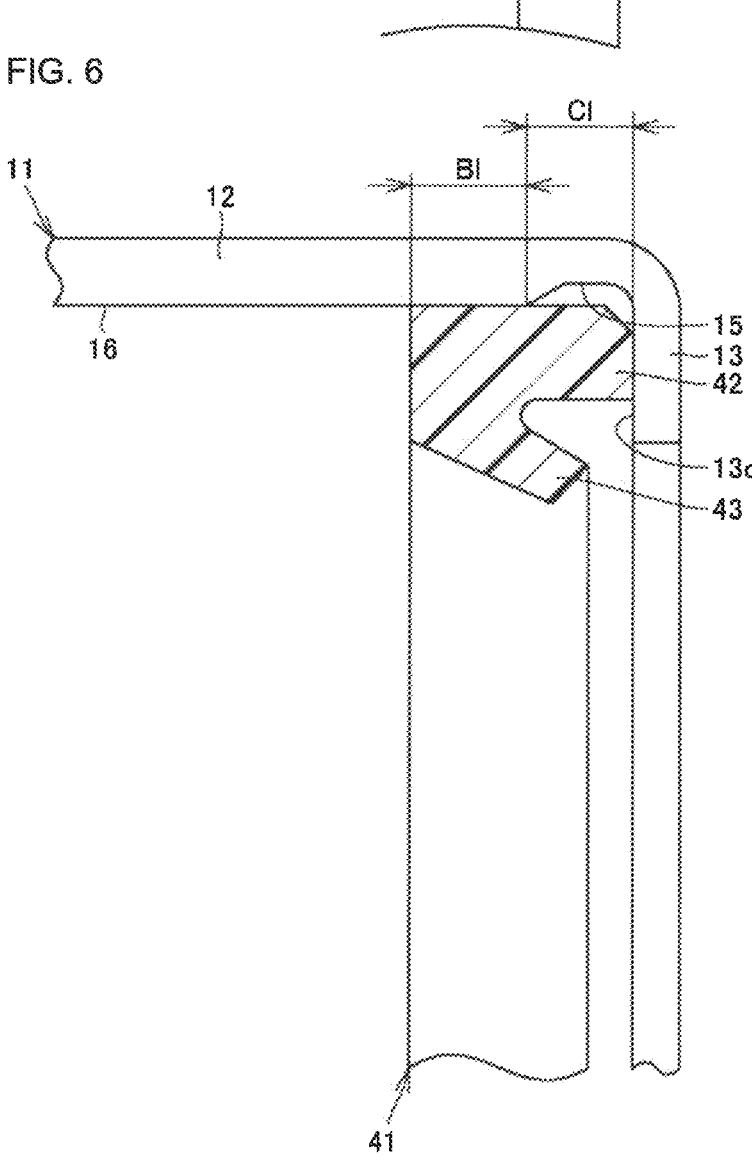
FIG. 5 is an enlarged section showing only a shell outer ring of an example of the present invention.
FIG. 6 is an enlarged section showing only one axial end portion of the shell type roller bearing according to the embodiment of the present invention.

In the present embodiment, the risk of the bulging is avoided by appropriately selecting the hardness. Specifically, the hardness of a curved portion 13r of the flange 13 is set in the range of 300 to 450 HV. This allows the flange 13 to be formed while reducing bulging of the inner peripheral surface 16 of the shell outer ring 11, thereby preventing the bearing clearance of the shell type roller bearing 10 from becoming partially small. Preferably, the hardness of portions 16f to 13p of the flange 13 shown in FIG. 5 is reduced (softened) in the range of 300 to 450 HV in order to further facilitate bending and stabilize quality. Specifically, it is desirable that the hardness of the point having the lowest (softest) hardness among the eight points shown in the portions 16f to 13p in FIG. 5 be in the range of 300 to 400 HV.

Hardness of an example of the present embodiment was measured.

FIG. 5 is an enlarged section showing only a shell outer ring of the example of the present invention. Black circles and black diamonds represent the places where hardness was measured. As shown in FIG. 5, the region from the cylindrical portion 12 to the flange 3 includes a connection portion 16f, a curved portion 13r, an axial end portion 13q, and an inner peripheral edge portion 13p in this order. The region consisting of the series of portions, namely the connection portion 16f, the curved portion 13r, the axial end portion 13q, and the flange inner peripheral edge portion 13p, is also referred to as bent edge portion because this region is formed by bending the edge of a raw material having a cylindrical shape.

In the product of the example, the hardness of the portions 16f to 13p is 300 to 450 HV.

According to the present embodiment, both corrosion resistance and ease of bending can be achieved by using austenitic stainless steel as the material of the shell outer ring 11 and setting the hardness of the flange 13 to 300 to 450 HV.

FIG. 6 is an enlarged section showing the seal member 41 fitted in the shell outer ring 11. The axial inner region of the seal member 41 is press-fitted in the inner peripheral surface 16. Regarding the axial fitting dimension B1 (also called interference range) of this fitted portion, the end portion of the inner peripheral surface 16 is preferably formed smooth so as to have a width of at least B1 or more and Ra of 0.6 [μm] or less. This is because there is a risk of air leakage if the surface roughness of the fitting portion between the inner peripheral surface 16 and the seal member 41 is high.

The axial outer region of the seal member 41 covers the relief 15 from inside in the radial direction. An inner surface 13c of the flange 13 contacts the base portion 42. The inner diameter of the base portion 42 is larger than the inner diameter of the flange 13, so that the base portion 42 will not come off in the axial direction through the flange 13. The inner diameter of the lip portion 43 is smaller than the inner diameter of the flange 13, and the lip portion 43 makes sliding contact with the outer peripheral surface of a valve stem (not shown) that is passed through the central bore of the seal member 41.

Figure 7:
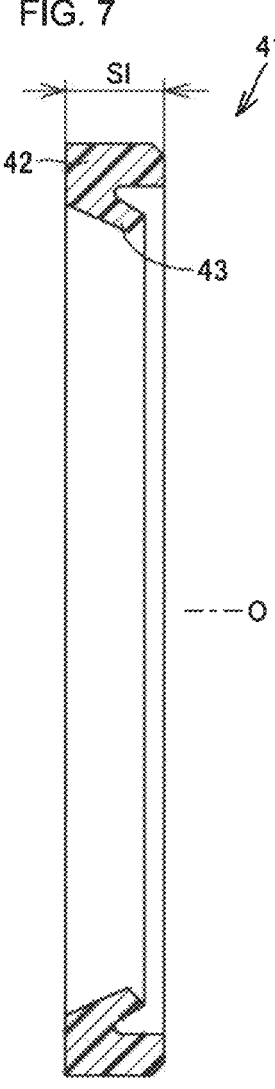
FIG. 7 is a longitudinal section showing only a seal member of the embodiment.

FIG. 7 is a longitudinal section showing only the seal member 41, and shows the overall axial dimension S1 of the seal member 41. Table 1 shows the relationship between the overall dimension S1 and the fitting dimension B1 described above. In the present embodiment, the overall dimension S1 is equal to the axial dimension of the base portion 42. The base portion 42 may have a chamfer 44. For example, the chamfer 44 is provided at the corner between the outer peripheral surface and the outer end surface.

TABLE 1

| Relation between proportion of interference range to seal width and seal lip reaction force | |
|---|---|
| Proportion of Interference Range to Seal Width (B1/S1 × 100) [%] | Rate of Decrease in Radially Inner Lip Reaction Force of Seal [%] |
| 100 | — |
| 54.0 | 7 |
| 49.0 | 20 |
| 34.5 | 23 |
| 29.0 | 27 |

In Table 1, based on the case where the proportion of the fitting dimension B1 of the seal member 41 to the overall dimension S1 of the seal member 41 is 100%, the rate of decrease is as low as 7% if the proportion of B1 to S1 is higher than 50%. On the other hand, when the proportion of B1 to S1 is less than 50%, the rate of decrease is as high as 20% or more, which may result in a decrease in sealing performance. Therefore, the proportion of B1 to S1≥50% is recommended. This ensures that the straining force of the lip portion 43.

The shell type roller bearing 10 of the present embodiment includes: the shell outer ring 11 that includes cylindrical portion 12 and the flanges 13, 14 extending radially inward from one axial end and the other axial end of the cylindrical portion 12 and that is made of an austenitic stainless steel material; the seal member 41 mounted in one axial end portion of the shell outer ring 11; the rollers 21 that make rolling contact with the inner peripheral surface 16 of the cylindrical portion 12; and the cage 31 disposed radially inside the shell outer ring 11 and holding the rollers 21. The inner diameter of the tilted surface 16b of one axial end portion of the inner peripheral portion 16 is larger than the inner diameter of the axial middle region of the inner peripheral surface 16, and the hardness of at least one flange 13 is in the range of 300 to 450 HV This ensures corrosion resistance, ease of forming the flange 13 by bending, and sealing performance of the seal member 41. In a modification that is not shown, the one axial end portion of the inner peripheral surface 16 may not have the tilted surface 16b, and the inner diameter of the one axial end portion of the inner peripheral surface 16 may be the same as the inner diameter of the axial middle region of the inner peripheral surface 16.

The relief 15 extending in the circumferential direction between the inner peripheral surface 16 and the flange 13 is formed in the inner periphery of the shell outer ring 11. The axial inner portion of the seal member 41 is press-fitted and fixed in the inner peripheral surface 16, and the axial outer portion of the seal member 41 contacts the flange 13 and covers the relief 16 from inside in the radial direction. The proportion of the width Cl of the relief 15 to the overall dimension in the axis O direction of the seal member 41 is 49% or less. This ensures sufficient sealing performance by the seal member 41. The thickness of the cylindrical portion 12 in the inner peripheral surface 16 is 0.4 to 0.6 [mm].

Additional description will be given regarding this point. The shell outer ring 11 of the shell type roller bearing 10 of the present embodiment is press-fitted in a hole in the case 107 (housing) shown in FIG. 1 or 2. The shell outer ring 11 of the shell type roller bearing 10 is thus mounted and fixed in the case 107 (housing). The inner diameter dimension (before press-fitting) of the housing hole in which the shell outer ring 11 is to be press-fitted is smaller than the outer diameter (before press-fitting) of the shell outer ring 11 by a predetermined value in the range of 0.015 to 0.025 mm. The case 107 forming the housing hole has a wall thickness of 20 mm or more, and a maximum value of its roundness and/or cylindricity is set to a correct accuracy with a tolerance of IT4 or a tighter tolerance (IT3 or less). The "accuracy" refers to the accuracy of the inner diameter dimension (before press-fitting) of the hole in which the shell outer ring 11 is to be press-fitted. After the shell outer ring 11 is press-fitted in the housing hole of the case 107, the proportion of the width Cl of the relief (FIG. 6) to the overall axial dimension S1 of the seal member 41 (FIG. 7) is 49% or less.

The length of the rollers 21 of the present embodiment is 2.1 to 5.4 times the diameter thereof. The seal member 41 is made of fluororubber, and the hardness of the seal member 41 is HS 65 to 85. This ensures corrosion resistance and sealing performance of the seal member 41. Since the portion of the inner peripheral surface 16 that makes surface contact with the axial inner portion of the seal member 41 has a roughness Ra of 0.6 [μm] or less, the risk of air leakage is eliminated. The shell type roller bearing 10 rotatably supports the valve stem 102 of the throttle valve or the valve stem 202 of the EGR valve.

Figure 8:
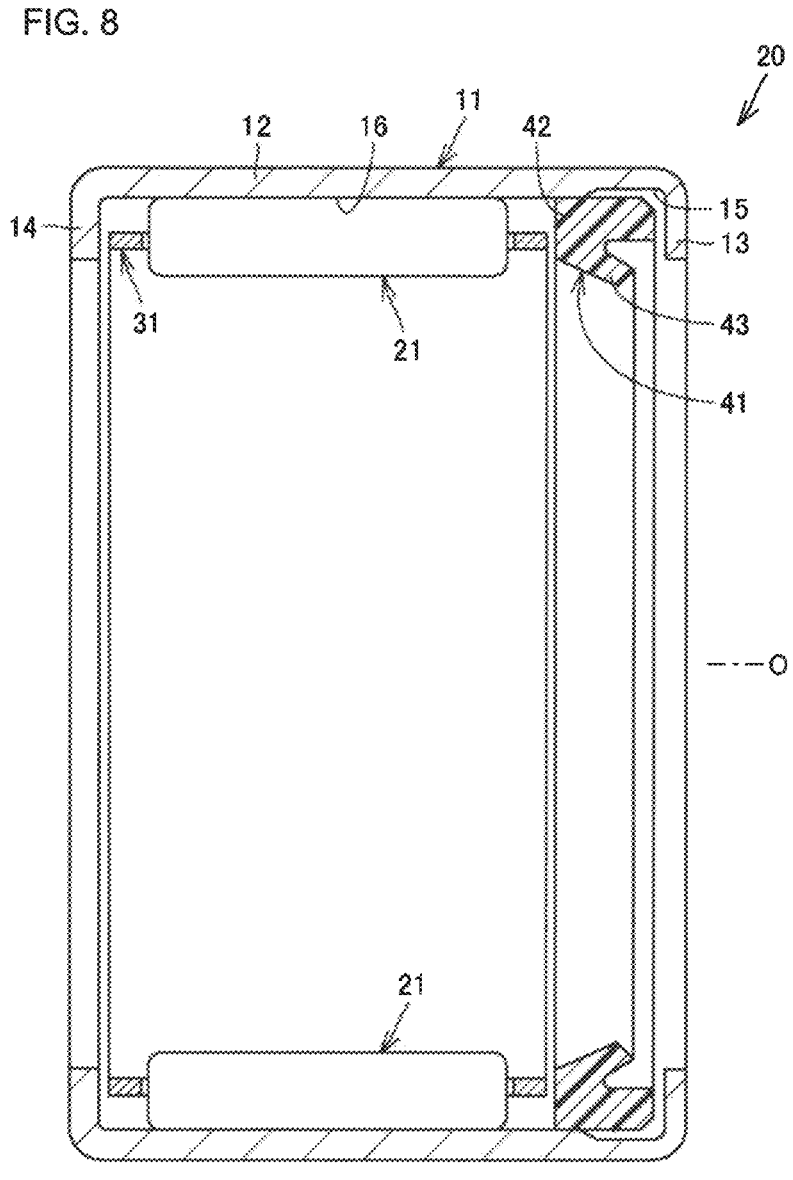
FIG. 8 is a longitudinal section of a shell type roller bearing according to another embodiment of the present invention.

Next, a modification of the present invention will be described. FIG. 8 is a longitudinal section showing a modification of the present invention. In this modification, the same configurations as those in the above embodiment are denoted by the same reference numerals as those in the above embodiment, and description thereof will be omitted. Configurations different from the above embodiment will be described. In a shell type roller bearing 20 of this modification, the seal member 41 is mounted in one axial end portion of the shell outer ring 11, but not in the other axial end portion. The shell type roller bearing 20 is used in place of the shell type roller bearing 10 of FIGS. 1 and 2. In this case, installation is performed so that the axial end portion with the seal member 41 mounted therein is located closer to the air pipe 106.

Although the embodiment of the present invention is described above with reference to the drawings, the present invention is not limited to the illustrated embodiment. Various modifications and alterations can be made to the illustrated embodiment within the same scope as the present invention or within a scope equivalent to the present invention.

INDUSTRIAL APPLICABILITY

The present invention is advantageously used in mechanical elements.

REFERENCE SIGNS LIST

10: shell type roller bearing, 11: shell outer ring, 12: cylindrical portion, 13, 14: flange, 13*c*: inner surface, 13*p*: inner peripheral edge portion, 13*q*: axial end portion, 13*r*: curved portion, 15: relief, 16: inner peripheral surface, 16*b*: tilted surface, 16*f*: connection portion, 31: cage, 41: seal member, 42: base portion, 43: lip portion, 60: ball bearing, 101: valve disc, 102: throttle valve stem, 103: elastic member, 104: drive transmission mechanism, 105: driving source, 106: air pipe, 107: case, 202: valve stem

The invention claimed is:

1. A shell type roller bearing, comprising:
   a shell outer ring that includes a cylindrical portion and flanges extending radially inward from one axial end and the other axial end of the cylindrical portion and that is made of an austenitic stainless steel material;
   a seal member mounted in one axial end portion of the shell outer ring;
   rollers that make rolling contact with an inner peripheral surface of the cylindrical portion; and
   a cage disposed radially inside the shell outer ring and holding the rollers, wherein
   an inner diameter of one axial end portion of the inner peripheral surface is equal to or larger than an inner diameter of an axial middle region of the inner peripheral surface, and
   at least one of the flanges has a hardness in a range of 300 to 450 HV,
   a relief extending in a circumferential direction between the inner peripheral surface and one of the flanges is provided in an inner periphery of the shell outer ring, a tilted surface with a slope, the tilted surface connecting to the relief, a diameter of the tilted surface gradually increasing toward an outer side in an axis direction, and
   a boundary is positioned between the tilted surface and the relief, the boundary having a diameter greater than the inner diameter of the inner peripheral surface by a radial dimension that is a predetermined value of 20 μm or less.

2. The shell type roller bearing according to claim 1, wherein
   of the flanges at both axial ends, one flange has a smaller thickness, and the flange having the smaller thickness has a hardness of 300 to 450 HV.

3. The shell type roller bearing according to claim 1, wherein
   a thickness of the cylindrical portion in the inner peripheral surface is 0.4 to 0.6 [mm].

4. The shell type roller bearing according to claim 1, wherein
   regarding the flange having a smaller thickness out of the flanges at both axial ends, a portion of the flange that has the smallest hardness has a hardness of 300 to 400 HV.

5. The shell type roller bearing according to claim 1, wherein
   a length of the rollers is 2.1 to 5.4 times a diameter of the rollers.

6. The shell type roller bearing according to claim 1, wherein
   the seal member is made of fluororubber, and the seal member has a hardness of HS 65 to 85.

7. A shell type roller bearing, comprising:
   a shell outer ring that includes a cylindrical portion and flanges extending radially inward from one axial end and the other axial end of the cylindrical portion and that is made of an austenitic stainless steel material;
   a seal member mounted in one axial end portion of the shell outer ring;
   rollers that make rolling contact with an inner peripheral surface of the cylindrical portion; and
   a cage disposed radially inside the shell outer ring and holding the rollers wherein
   an inner diameter of one axial end portion of the inner peripheral surface is equal to or larger than an inner diameter of an axial middle region of the inner peripheral surface, and
   at least one of the flanges has a hardness in a range of 300 to 450 HV, and
   a portion of the inner peripheral surface that makes surface contact with the axial inner portion of the seal member has a roughness Ra of 0.6 μm or less.

* * * * *